A. C. EASTWOOD.
ELECTRIC MOTOR CONTROL SYSTEM.
APPLICATION FILED APR. 26, 1916.
1,284,266.
Patented Nov. 12, 1918.
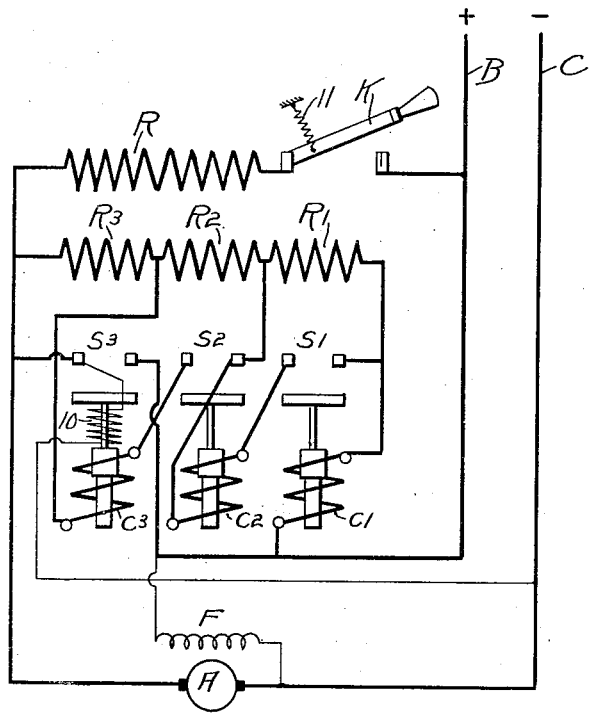

UNITED STATES PATENT OFFICE.

ARTHUR C. EASTWOOD, OF CLEVELAND, OHIO, ASSIGNOR, BY MESNE ASSIGNMENTS, TO THE ELECTRIC CONTROLLER & MANUFACTURING COMPANY, A CORPORATION OF OHIO.

ELECTRIC MOTOR-CONTROL SYSTEM.

1,284,266.    Specification of Letters Patent.    Patented Nov. 12, 1918.

Application filed April 26, 1916. Serial No. 93,631.

*To all whom it may concern:*

Be it known that I, ARTHUR C. EASTWOOD, a citizen of the United States, residing at Cleveland, in the county of Cuyahoga and State of Ohio, have invented new and useful Improvements in Electric Motor-Control Systems, of which the following is a specification.

This invention relates generally to motor-control systems, but more particularly to automatic electromagnetically-controlled systems.

It has been the usual practice to construct a motor control system and apparatus for starting a motor with the view of meeting only one set of predetermined motor-current requirements. It is, however, sometimes desirable quickly and easily to adapt a control system to operate under one or another of several sets of motor current requirements. One such case is that in which one motor controller is to be used at different times to start motors of different horsepowers, and another case is that in which a controller is used occasionally to start a motor under loads in excess of the normal loads.

The object of my invention is to provide a motor control system which may be easily and quickly adapted to different motor starting requirements, such, for example, as those just specified.

With these and other objects in view, the invention consists of the apparatus and electrical connections thereof, as described in the following specification, reference being made to the accompanying drawing which is a diagrammatic representation of a motor system embodying the present invention.

On the drawing, I have shown the motor armature A and the shunt field winding F. $R^1$, $R^2$, and $R^3$ are three sections of starting resistance; and $S^1$, $S^2$, and $S^3$ are three accelerating switches for successively short-circuiting the said resistance sections to start the motor. Any well-known type of accelerating or resistance cutting-out switch may be used, but I prefer to use for these switches the type of switch disclosed in Canfield's application, Serial Number 583,000, filed September 21, 1910, and Eastwood's Patent, No. 1,040,292, issued October 8, 1912, in which the operating windings of the switches are connected in series with the motor and the switches possess the peculiar characteristic of being locked open when the current in the winding is above a predetermined value, and closing when the current is reduced to that value. On the resistance switch $S^3$ I have provided a shunt holding winding 10, which merely acts to hold the switch closed after it has been closed by the operating winding $C^3$, but is not sufficiently strong to close the switch. When the switch $S^3$ has closed, the winding 10 is connected directly across the supply mains. $C^1$, $C^2$, and $C^3$ are the series windings of the switches $S^1$, $S^2$, and $S^3$.

I provide an additional resistance section R, which is, in general, connected in parallel with the other three sections and is thrown into and out of circuit by the knife switch K. When the knife switch K is open, as shown in the drawing, the control system as described below operates to start the motor under one set of predetermined starting conditions; and when the knife switch K is closed the controller operates to start the motor under another set of starting current conditions. The knife switch may be opened or closed at will by the operator of the controller.

The switch K being open, and the supply lines B and C being connected to a source of electric supply, the operation of the described motor system is as follows: The current flows from the positive line B through the winding $C^1$, the resistance sections $R^1$, $R^2$, and $R^3$, and the armature A to the negative line C. The ohmic value of the resistance sections is such that the current in the winding $C^1$ is sufficient to lock the switch $S^1$ open and cause the armature A to rotate. As soon as the current falls to the value at which the switch $S^1$ is set to operate, this switch closes and short-circuits the resistance section $R^1$ and connects the operating winding $C^2$ of the switch $S^2$ in series with the resistance sections $R^2$ and $R^3$. The switch $S^2$ will be locked open until the current falls to the value at which this switch is set to operate. The switch $S^2$ then closes and short-circuits the resistance section $R^2$ and connects the operating winding $C^3$ of the switch $S^3$ in series with the resistance section $R^3$. The current in the winding $C^3$ locks the switch $S^3$ open until the current falls to a predetermined value and then causes it to close and short-circuit not only the resistance section R³ but also the resistance sections R¹ and R², whereupon the switches S¹ and S² drop open, the switch S³ being held closed by current flowing through the holding winding 10 and the contacts of the switch S³. The motor armature is now connected directly across the line through the contacts S³ and the motor runs at its normal speed.

If it is desired to give the motor starting-peaks of current in excess of the normal starting-peaks obtainable by the employment of that portion of my motor system whose operation has just been described, the switch K is closed, whereupon the current from the line B has two paths, that above described through the winding C¹ and the three resistance sections R¹, R², and R³; and the other through the switch K and the resistance section R. Approximately the same value of current flows through the winding C¹ as before, but the current through the armature A is greater by the amount flowing through the resistance section R; consequently, the switch S¹ and subsequently the switches S², S³, will close successively at approximately the same current value through their windings as before, but the current flowing to the motor will throughout acceleration be greater by an amount depending upon the ohmic value of the resistance section R. The successive peaks of starting current caused by the successive short-circuiting of the resistance sections are substantially equal and of predetermined amount.

The additional resistance R will be found advantageous for many purposes, a few of which I will now give. When a rolling mill is cold and the oil in the bearings thereof is stiff, it may be that the current admitted through the ordinary starting resistance is not large enough to turn the motor, although it is large enough to start the motor when the parts of the mill have become warmed up. By closing the switch K for a short time the motor will receive current enough to start, and when the mill is warmed up, the switch K may be opened and the motor thereafter started without the use of the shunt resistance K. The system shown with the switch K open may be used to start a motor of 20 H. P., for example, but with the switch K closed, to start a motor of 40 H. P., for example.

Other conditions to which this invention is applicable will readily appear to those skilled in the art to which this invention relates.

When the switch K and the resistance section R are to be used only to start the motor under very heavy loads, the switch K may be provided with the spring 11 to hold it normally open, which necessitates closing the switch K each time it is desired to start the motor under a heavy load, and avoids the danger of accidentally leaving it closed and subjecting the motor to large currents when unnecessary.

When the switch K is closed, the motor starting current is increased which decreases as the resistance sections are cut out, until the section R³ is cut, whereupon the resistance R is short-circuited, permitting the motor to run at a normal speed, substantially the same as if the switch K were open. It is an advantage to have the current increment through the resistance R reduced as the motor speeds up, for the overload due to the circuit through the resistance R becomes less and less and is finally eliminated when the motor reaches normal running speed.

It will be understood that my invention may be carried out with various types of accelerating switches; and that various modifications may be made of the arrangement of the resistance R with respect to the remainder of the system, wherefore my invention should not be limited to the exact arrangement shown. It will also be understood that my invention may be applied to motor reversing control systems.

I claim—

1. In a motor control system, a motor, a motor circuit, a starter for the motor comprising means for maintaining the motor starting current within predetermined limits, and means for increasing the motor starting current by an increment which decreases throughout the starting of the motor.

2. In a motor control system, a motor, a motor circuit, a starter for the motor comprising means for maintaining the motor starting current within predetermined limits, and a single means for increasing the motor starting current by an increment which decreases throughout the starting of the motor.

3. In a motor control system, a motor, a motor circuit, a starter for the motor comprising means for maintaining the motor starting current within predetermined limits, and a single means for increasing the motor starting current by an increment which gradually decreases throughout the starting of the motor.

4. In a motor control system, a motor, a motor circuit, a starter for the motor comprising means for maintaining the motor starting current within predetermined limits, and means comprising a resistance in the motor circuit and in parallel with the maintaining means for increasing the motor starting current by an increment which decreases throughout the starting of the motor.

5. In a motor control system, a motor, a motor circuit, a starter for the motor comprising means for maintaining the motor starting current within predetermined limits, and means comprising a resistance and means for including the same in the motor circuit and in parallel with the maintaining means at will whereby the motor starting current may be increased at will by an increment which decreases throughout the starting of the motor.

6. In a motor control system, a motor, a motor circuit, a starter for the motor comprising means for maintaining the motor starting current within predetermined limits, and means comprising a resistance in the motor circuit and a switch for controlling the same for increasing the motor starting current at the will of the operator by an increment which automatically gradually decreases throughout the starting of the motor.

7. In a motor control system, a motor, a motor circuit, a plurality of starting resistance sections in the circuit, a plurality of switches, means for causing the switches to successively short-circuit the resistance sections to start the motor and whereby the successive peaks of starting current caused by the successive short-circuiting of the resistance sections are substantially equal and of predetermined amount, and a single means for increasing the successive peaks by successively smaller increments.

8. In a motor control system, a motor, a motor circuit, a plurality of starting resistance sections in the circuit, a plurality of switches, means for causing the switches to successively short-circuit the resistance sections to start the motor and whereby the successive peaks of starting current caused by the successive short-circuiting of the resistance sections are substantially equal and of predetermined amount, and means comprising a resistance in the motor circuit for increasing the successive peaks by successively smaller increments.

9. In a motor control system, a motor, a motor ciruit, a plurality of starting resistance sections in the circuit, a plurality of switches, means for causing the switches to successively short-circuit the resistance sections to start the motor and whereby the successive peaks of starting current caused by the successive short-circuiting of the resistance sections are substantially equal and of predetermined amount, and means comprising a single resistance and means for including the same in the motor circuit at will whereby the successive peaks may be increased at will by an increment which automatically decreases throughout the starting of the motor.

10. In a motor control system, a motor, a motor circuit, a plurality of resistance sections in the circuit, a plurality of switches adapted to close to successively short-circuit the resistance sections to start the motor and to maintain the motor starting current below predetermined limits, an auxiliary resistance for controlling the predetermined limits, and means including electrical connections whereby as the switches successively close the controlling effect of the auxiliary resistance is diminished and finally nullified.

11. In a motor control system, a motor, a motor circuit, a plurality of resistance sections in the circuit, a plurality of switches adapted to close to successively short-circuit the resistance sections to start the motor and to maintain the motor starting current below predetermined limits, an auxiliary resistance for controlling the predetermined limits, and means including electrical connections whereby as the switches successively close the controlling effect of the auxiliary resistance is gradually diminished and when the last switch closes is nullified.

12. In a motor control system, a motor, a motor circuit, a plurality of resistance sections in the circuit, a plurality of switches adapted to close to successively short-circuit the resistance sections to start the motor and to maintain the motor starting current below predetermined limits, a single auxiliary resistance effective to increase the predetermined limits, and means including electrical connections whereby each switch in closing cuts out a resistance section and also diminishes the effect of the auxiliary resistance and whereby the last switch in closing nullifies the effect of said auxiliary resistance.

13. In a motor starter, a motor, a motor circuit, resistance sections in the circuit for limiting the motor starting current, a single auxiliary resistance section adapted to be connected at will in the motor circuit to increase the starting current, switches adapted to close successively to short-circuit the resistance sections to gradually reduce the current-increasing effect of the auxiliary resistance, leaving it in the motor circuit, and to short-circuit the auxiliary resistance when the last switch closes.

Signed at Cleveland, Ohio, this 21st day of April, 1916.

ARTHUR C. EASTWOOD.